April 5, 1966 E. G. NASSIMBENE 3,244,369
INPUT-OUTPUT CONVERSION APPARATUS
Filed Sept. 25, 1964 3 Sheets-Sheet 1

INVENTOR.
ERNIE G. NASSIMBENE
BY John H. Holcombe
ATTORNEY

April 5, 1966 E. G. NASSIMBENE 3,244,369

INPUT-OUTPUT CONVERSION APPARATUS

Filed Sept. 25, 1964 3 Sheets-Sheet 3

United States Patent Office 3,244,369

Patented Apr. 5, 1966

3,244,369
INPUT-OUTPUT CONVERSION APPARATUS

Ernie G. Nassimbene, San Jose, Calif., assignor to International Business Machines Corporation, New York, N.Y., a corporation of New York Filed Sept. 25, 1964, Ser. No. 399,316
3 Claims. (Cl. 235—145)

This invention relates generally to a conversion apparatus and, more particularly, to conversion apparatus including a plurality of selectively energizable stages.

In many applications there exists a need for an economical two-way conversion apparatus. One example is an input-output device allowing two-way communication between an individual and a computer or other digital device. Previous devices for accomplishing such two-way conversion, such as complex modifications and additions to teletype or typing systems, have been too costly to justify widespread usage. Further, most prior devices required two completely separate systems, one allowing an individual to communicate with a computer, such as a keyboard and conversion system, and the other allowing a computer to communicate to the individuals, such as a display apparatus and conversion system.

Thus, it is an object of the present invention to provide a novel and economical two-way conversion apparatus.

Another object of the present invention is to provide a novel, economical device for two-way communication between an individual and digital apparatus.

Still another object of the present invention is to provide a combination keyboard and display apparatus utilizing a two-way conversion device.

In accordance with this aspect of my invention, a two-way conversion apparatus is provided having a pluralty of three-element gas tube stages, each stage being connected to a key of a keyboard so that actuation of the key ignites the gas tube stage, a common output connected to each of the stages, and a common input connected to each of the stages and so adapted that, upon receipt of a pulse on the common input, the stage immediately following the ignited stage is ignited and the previously ignited stage extinguished, thereby providing an output pulse on the common output line. Thus, the actuated key is indicated by the number of pulses required to sequence through the following stages until the final stage is ignited. The computer communicates by supplying a pulse to ignite the first stage and continuing the supply of pulses, sequentially stepping the conversion apparatus, until the desired stage has been ignited, the ignition of that stage providing a displace and understandable by an individual.

A further object of the present invention is to provide a touch-sensitive kayboard for communicating to a digital device, wherein actuation of a key causes a visual display indicative of the key which was actuated and wherein the digital device may itself operate the display to thereby communicate to the user.

In accordance with this latter aspect of my invention, touch-sensitive three-element neon gas tube stages are utilized as the gas tube stages, above, and means are provided to utilize the light given off by the ignited neon as a display.

A feature of the present invention is that the indication of the touch-sensitive key which has been actuated may be obtained by placing the corresponding neon tube directly under the key.

A further feature of the present invention is that interchangeable, transparent format sheets may be placed between the neon tubes and the transparent, touch-sensitive keys, thereby allowing alteration of the meaning of each of the keys.

The foregoing and other objects, features and advantages of the invention will be apparent from the following more particular description of a preferred embodiment of the invention, as illustrated in the accompanying drawings in which.

Figure 1:
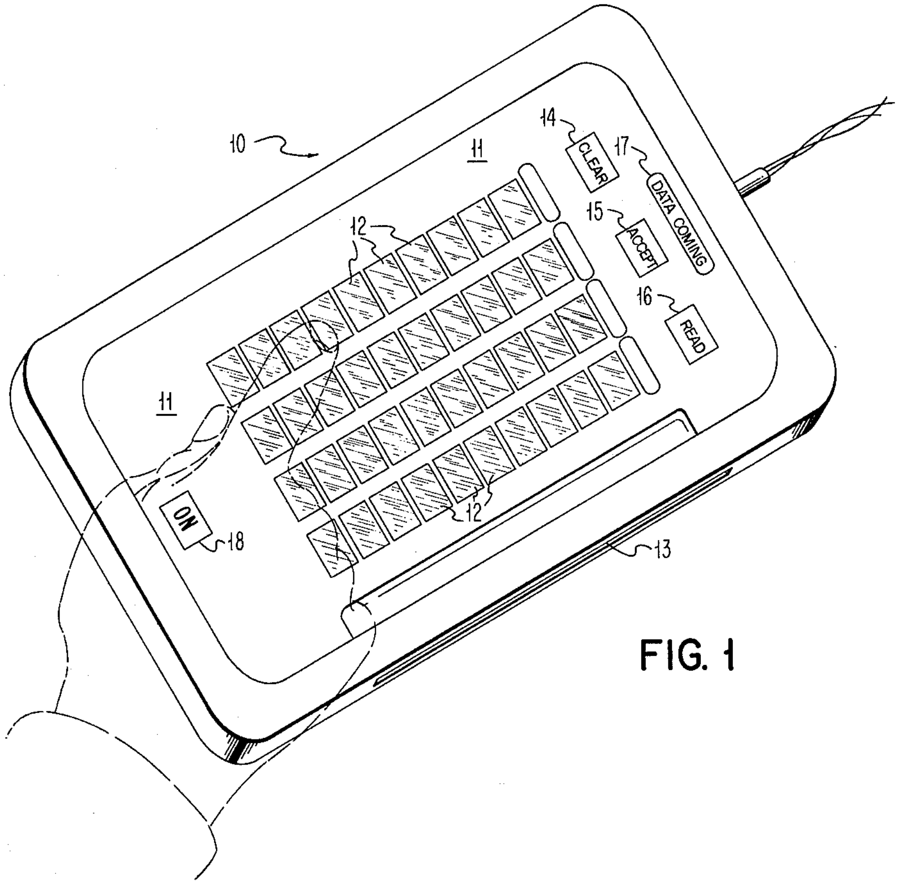
FIG. 1 is a perspective view of the exterior of a keyboard constructed in accordance with the present invention.

Referring to FIG. 1, there is shown a keyboard unit 10 having a face plate 11 with a plurality of rows of touch-sensitive key areas 12 thereon. Each of the key areas is made of a transparent material, and room is provided in the keyboard for placement of a format sheet immediately underneath the keys. A slot 13 is provided for insertion and withdrawal of the format sheets. Thus, by changing format sheets, the meaning of each of the keys may be altered at will. Of course, it is necessary to coincidentally alter the program being followed by the associated computer.

Three touch-sensitive keys with permanent meanings are provided: "clear" key 14, "accept" key 15 and "read" key 16. Additionally, two permanent panel indicator light sources 17 and 18 are provided. Light source 18 is used to indicate that power is being supplied to the terminal, making it ready for used. Light source 17 is a neon lamp lighted, as will be explained hereinafter, by the computer to indicate that the computer is ready to transmit data to the terminal for the purpose of making a display.

Touching clear key 14 resets the entire keyboard so that any other keys previously actuated are turned off without transmitting data to the computer. Accept key 15 is touched to response to the lighting of lamp 17 to indicate that the operator of the terminal is ready to accept a display of data from the computer. Read key 16 is touched by the operator of the terminal to allow the computer to read data the operator has previously entered by touching various ones of the keys 12.

In the preferred embodiment of the invention, each of the keys 12, 14, 15 and 16 utilizes a neon lamp which is located immediately below the transparent key. In this manner, touching one of the keys ignites the associated neon lamp, thereby iluminating the key to provide a display.

Thus, to enter information from the keyboard 10 to the associated computer, the operator touches selected keys 12, visually verifies the message by noting the illumination of the touched keys, and then touches the read key 16 which sends a signal to the computer indicating that this terminal has a message. When the computer is ready to receive the information, it sends a pulse to the terminal for transmitting the message, as will be explained hereinafter.

To transmit information to the terminal 10, the computer sends a pulse which turns on the "data coming" lamp 17. When the operator is ready to receive the message, he touches the accept key 15 which sends a pulse back to the computer, and the computer responds by sending the message, lighting the appropriate keys 12, thereby providing a display.

Figure 2:
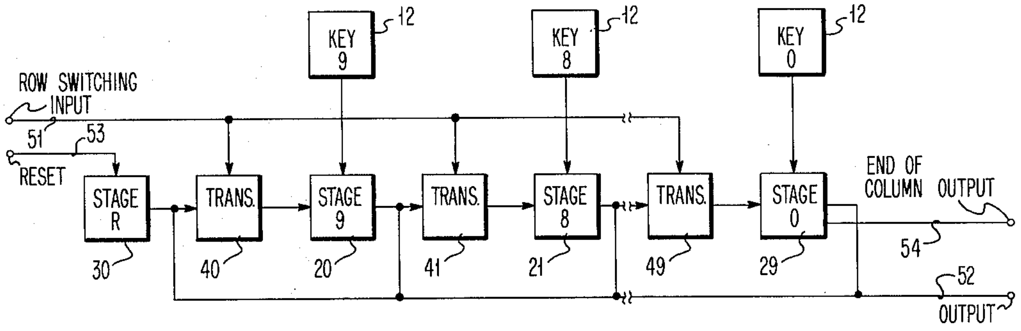
FIG. 2 is a functional block diagram of a column of a two-way converted constructed in accordance with the present invention.

Referring to FIG. 2, there is shown a functional block diagram of the components comprising the converter for one column of keys 12 of keyboard 10. Each key 12 is connected to a corresponding bistable stage 20–29. Each of the stages is normally in the "off" state, and is so arranged that actuation of the corresponding key 12 causes the stage to switch to the "on" state. The stages are so interlocked that actuation of any one stage into the "on" state causes any other stage that may be on to be turned off. An additional "reset" stage 30 is provided which is on when none of the keys have been actuated and which is used for resetting the entire column by switching off any stage that has been actuated.

Each of the stages 20–30 is connected to the following stage by means of a transfer circuit 40–50 so that the stages are connected in a complete loop. A common input line 51 is connected to each of the transfer circuits. If the stage immediately preceding a transfer circuit is ignited, the transfer circuit will respond to a pulse on input line 51 by igniting the immediately succeeding stage. Due to the interlock arrangement of the stages, the ignition of the immediately succeeding stage causes the previously ignited stage to be turned off. Additionally, upon ignition of the immediately succeeding stage, that stage produces an output pulse on the common output line 52 which is connected to each one of the stages. A "reset" input line 53 is connected to stage 30, and an input pulse appearing on the line ignites stage 30, thereby turning off any previously ignited stage and resetting the entire column. Stage 29 is provided with an additional "end-of-column" output line 54 which produces an output when stage 29, the last stage in the column, is on.

In operation, assuming that the column has been reset so that stage 30 is on, the operator enters information from the keyboard 10 to the associated computer by touching a selected one of the keys 12. Touching a key 12 ignites the corresponding stage, as, for example, touching key #8 activates stage 21. Due to the interlocking arrangement of the stages, ignition of stage 21 turns off stage 30 so that only stage 21 is on. The ignition of stage 21 causes an illumination of the associated key #8, allowing the operator to visually verify the message.

Assuming that the operator had intended to touch key #9, the operator may correct the message by merely touching key #9. This causes stage 20 to be ignited, and the interlock turns off stage 21. The ignition of stage 20 now illuminates key #9 so that the operator may again verify the message.

Assuming that the operator is satisfied that the message is correct, the operator then touches the read key 16 of FIG. 1, which sends a signal to the computer indicating that terminal 10 has a message. When the computer is ready to receive the information, it sends a series of pulses to the terminal 10, which are presented on row switching input 51 and are received by each one of the transfer circuits 40–50. Since stage 20 is ignited, transfer circuit 41 responds to the first input pulse on line 51 by igniting stage 21, which causes stage 20 to be extinguished. Additionally, the ignition of stage 21 produces an output pulse on line 52 which is transmitted to the computer. In a similar manner, each succeeding input pulse on line 51 ignites the next succeeding stage and produces an output pulse on line 52 until stage 29 has been ignited, producing also an output pulse on end-of-column output line 54. The output appearing on line 54 indicates that the end of the column has been reached and that the number of pulses received on line 52 corresponds to the position of the actuated key in the column. The computer responds to the pulse on line 54 by ceasing the supply of input pulses on line 51.

To transmit information to the terminal, the computer sends a pulse which turns on the "data coming" lamp 17 of FIG. 1. When the operator is ready to receive the message, he touches the accept key 15 of FIG. 1, thereby supplying a pulse to the computer and also applying a pulse to reset line 53, resetting the column. The computer responds to the pulse by sending the message on row switching input 51. The message comprises the number of pulses necessary to sequentially ignite the desired number of stages succeeding stage 30. The last stage ignited illuminates the corresponding key 12, thereby providing a display.

Figure 3:
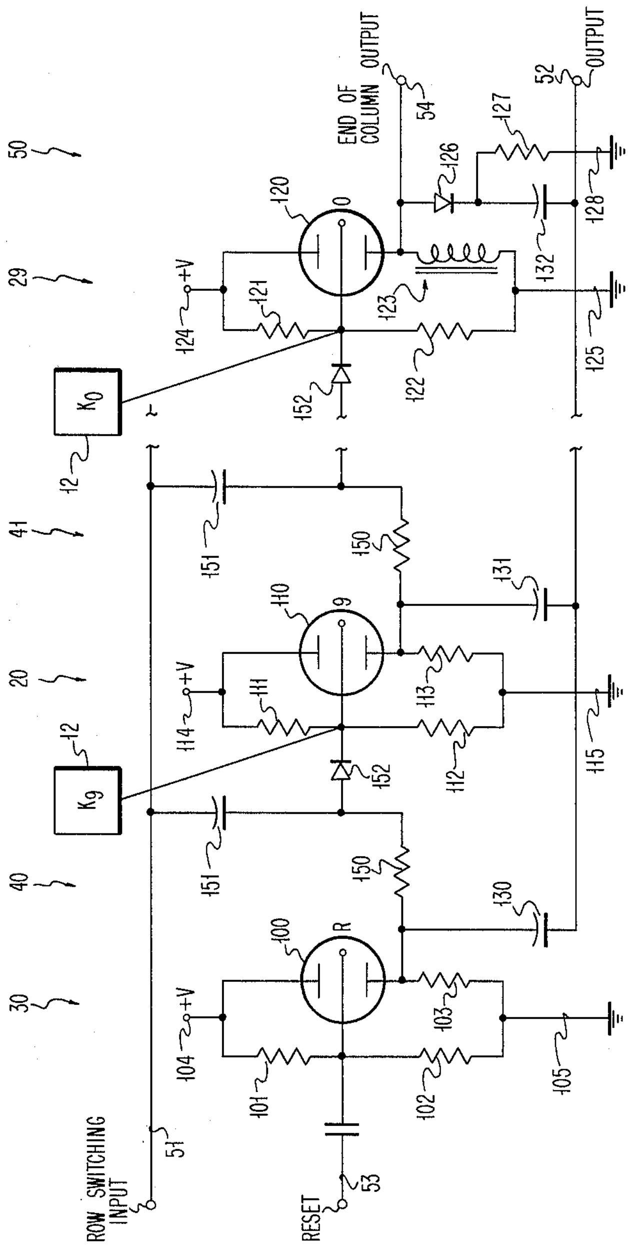
FIG. 3 is a schematic diagram of the electronic components comprising the column of a converter of FIG. 2.

Referring to FIG. 3, there is shown a detailed, schematic diagram of the converter of FIG. 2.

In FIG. 3 is shown a three-element neon tube 100 and resistors 101, 102 and 103, which together comprise stage 30 of FIG. 2. The center electrode of neon tube 100 is connected to reset line 53 and to a voltage divider formed by resistors 101 and 102 between voltage supply 104 and ground terminal 105. The top electrode of neon tube 100 is connected directly to voltage supply 104, and the bottom electrode is connected to one terminal of resistor 103, the other terminal of which is connected to ground terminal 105.

In one example of the embodiment of FIG. 3, resistors 101 and 102 are each two megohms, resistors 103 is 33,000 ohms, and voltage supply 104 is 150 volts. Thus, the top element of neon tube 100 is at 150 volts and, when the neon tube is off, the lower electrode is at ground potential. Voltage divider 101 and 102 establishes a 75-volt biasing potential at the center electrode of the neon tube, which is not sufficient to ignite the tube. Receipt of a 60-volt or greater pulse on reset line 53 causes neon tube 100 to ignite.

The other stages are constructed similarly to stage 30. For example, stage 20 includes neon tube 110, a voltage divider formed by resistors 111 and 112, resistor 113, voltage supply 114 and ground terminal 115. The only difference from stage 30 is that the center electrode of neon tube 110 is connected to a key 12, whereas the center electrode of neon tube 100 is connected to reset line 53. Key 12 is conductive, and it has been found that a human being touching the key causes the neon tube 110 to ignite. The key 12 may be coated with a dielectric, forming a capacitor between the finger and conductive key without substantially affecting the touch-sensitivity of the neon tube.

The other stages of FIG. 2, with the exception of stage 29, are constructed identically to stage 20. In FIG. 3, stage 29 is shown as comprising neon tube 120, a voltage divider comprising resistors 121 and 122, voltage supply 124, and ground terminal 125, but includes a relay actuating coil 123 instead of the resistors of the other stages. The function of the relay will be explained hereinafter. Stage 29 also includes a diode 126 and resistor 127 connected to ground terminal 128 to provide the end of a column output pulse on line 54.

Each of the stages is connected by means of a capacitor 130, 131 or 132 to output terminal 52. In an example of the preferred embodiment, these capacitors are .01 microfarad. Thus, whenever a neon tube is ignited, the current flow through resistor 103, 113 or coil 123 raises the potential of the lower electrode of the neon lamp from ground to +70 volts in the example shown. This 70-volt change is transmitted through capacitor 130, 131, or 132 to output line 52.

The common output line 52 also serves as the interlock mechanism between the various stages which allows only one neon tube to be on at one time. Assuming that neon tube 110 is on and tube 120 is ignited by the operator touching key 0, the ignition of tube 120 causes a 70-volt output pulse to be transmitted by capacitor 132 to output 52. This pulse is also transmitted by capacitor 130 to the lower electrode of tube 100, which produces no effect since tube 100 is already extinguished. However, the transmission of the pulse by capacitor 131 to the lower electrode of neon tube 110, which previously was on, raises the voltage at the lower electrode from 70 to 140 volts, thereby decreasing the potential between the upper and lower electrodes of the tube to 10 volts, extinguishing the tube.

Since all the stages are arranged with a similar capacitive output connected to terminal 52, the energization of any one of the tubes will thereby extinguish any tube previously on.

Each of the stages are interconnected by means of one of the transfer circuits of FIG. 2, all of which are connected to row switching input 51. All of the transfer circuits are identical and include a resistor 150, a capacitor 151, and a diode 152, as shown in FIG. 3. As explained with reference to FIG. 2, an input pulse appearing on row switching input 51 causes the transfer circuit immediately following a stage which is on to ignite the immediately succeeding stage. The interconnection means described then extinguishes the stage which previously was on. In an example of the preferred embodiment, the capacitor 151 is 200 micro-microfarads and the resistor 150 is 1 megohm.

In the circuit of this example, assuming that neon tube 100 is ignited, the 70-volt potential at the lower electrode of the tube is transmitted by resistor 150 and diode 152 to the center electrode of neon tube 110. When a 90-volt pulse on row switching input line 51 is transmitted by a capacitor 151 and diode 152 to the center electrode of tube 110, the voltage of the center electrode is raised to 160 volts. This voltage is substantially greater than the 100-volt ignition voltage needed to fire the neon tube. Since no other tubes than neon tube 100 had been on, the 90-volt switching input pulse is not sufficient to fire any of the other tubes. The interlocking arrangement previously described then extinguishes neon tube 100, leaving only neon tube 110 on.

Thus, each successive row switch input pulse appearing on line 51 will cause the next succeeding neon tube to be ignited, until neon tube 120 is reached. The ignition of neon tube 120 then energizes coil 123 and causes an output pulse to appear at the end-of-column output line 54. As will be explained hereinafter, the energization of coil 123 prevents the receipt of further pulses on row switching input line 51.

Figure 4:
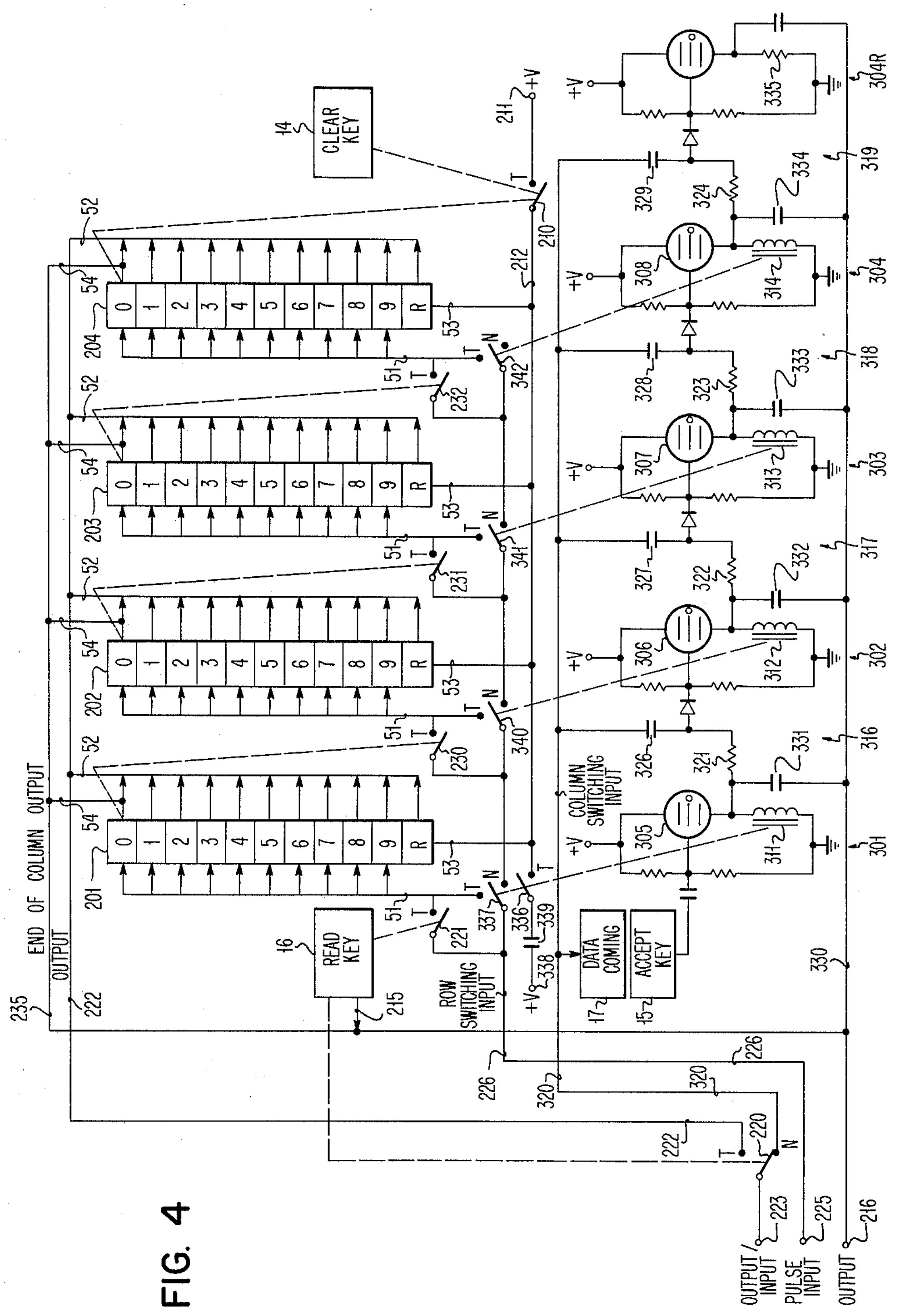
FIG. 4 is a functional block diagram of a complete two-way converter constructed in accordance with the present invention.

Referring to FIG. 4, there is shown a functional block diagram of the entire electronic circuitry comprising terminal 10 of FIG. 1. Illustrated are four columns 201–204 of stages, the columns being constructed in accordance with FIGS. 2 and 3. Along with each column is shown row switching input line 51, output line 52, reset line 53, and end-of-column output 54.

Assuming that the operator wishes to reset the keyboard 10, clear key 14 is touched. Clear key 14 is constructed in accordance with stage 29 of FIGS. 2 and 3, including relay coil 123, but without output means 52 or 54. Upon energization, relay coil 123 actuates relay switch 210 to the "transfer" or T position. This connects voltage supply 211 to lines 212 and 213, providing a 150-volt signal on those lines.

Line 212 is connected to the reset input lines 53 of each of the columns of stages 201–204, and the 150-volt signal resets each of the columns as described above. To enter information from the keyboard 10 to the associated computer, read key 16 is provided, which is constructed similarly to stage 29 of FIGS. 2 and 3, and includes an output line 215 similar to output line 54 of stage 29. Output line 215 is connected to the computer by means of output terminal 216. The relay coil of key 16 is connected to switches 220 and 221. Actuation of switch 220 connects output line 222 to the computer by means of output/input terminal 223. Output line 222 is connected to output line 52 of each of the columns 201–204. A pulse source of the computer is connected to pulse input terminal 225, which is connected to row switching input line 226. The energization of the relay coil of key 16 operates switch 221 and connects row switching input 226 to row switching input 51 of column 201.

As mentioned with reference to FIG. 3, stage 0 of each column includes a relay coil 123. This relay coil is connected to a switch in the immediately succeeding column. For example, the relay coil of stage 0 of column 201 is connected to switch 230 which, when actuated, connects row switching input line 226 to row switching input line 51 of column 202. In a similar manner, the relay coil of stage 0 of column 202 is connected to switch 231, and the relay coil of stage 0 of column 203 is connected to switch 232.

The relay coil of stage 0 of column 204 is connected to switch 210 to reset all of the columns upon energization of stage 0.

Thus, in operation, the operator enters information from the keyboard 10 to the associated computer by touching selected keys in the columns 201–204. As described above, the operator then visually verifies the message by noting the illumination of the touched keys, and then touches the read key 16. Actuation of key 16 supplies an output pulse at output terminal 216 which notifies the computer that the terminal has a message. As described above, operation of key 16 actuates switches 220 and 221 to the transfer position. When the computer is ready to receive the information, it sends a series of pulses to pulse input terminal 225. These pulses are directed by row switching input line 226 and switch 221 to row switching input line 51 of column 201. As described with reference to FIG. 3, these input pulses cause the stages to step consecutively until stage 0 is reached. Each time a stage is stepped, an output pulse appears on output line 52. Output line 222 and switch 220 direct these output pulses to output/input terminal 223 for transmission to the computer.

Upon operation of stage 0, an output pulse is provided on end-of-column output line 54 which is transmitted by line 235 to output terminal 216. The computer then counts the number of output pulses received until the end-of-column output pulse is received to indicate which of the stages had been activated. Additionally, the energization of stage 0 causes relay coil 123 to operate switch 230 to the transfer position. This connects pulse input 225 to row switching input line 51 of column 202. The stages are then sequentially advanced similarly to row 201, whereupon the relay coil of stage 0 actuates switch 231 of column 203. Again, the pulses from the computer sequentially advance the stages until stage 0 of column 203 is energized, thereby transferring switch 232 and allowing the advancement of the stages of row 204.

Upon the energization of stage 0 of column 204, the stage operates switch 210, thereby applying a pulse on line 53 of each column, resetting the columns. Thus, after row 204 has been read by the computer, the entire terminal has been reset. At this time, read key 16 is extinguished, and switches 220 and 221 return to the "normal" position.

To allow the computer to transmit information to the terminal 10, a plurality of neon tube stages 301–304 are provided. Each of these stages is constructed similarly to stage 29 of FIG. 3 and include neon tubes 305–308 and relay coils 311–314. The stages are interconnected by means of transfer circuits 316–319, which are connected to column switching input line 320. Each of the transfer circuits is constructed similarly to the transfer circuits 40–50 of FIG. 1. Resistors 321–324 and capacitors 326–329 are identical to resistors 150 and capacitors 151 of FIG. 3. As described with respect to FIG. 3, the transfer circuits respond to the appearance of a pulse on line 320 by igniting the stage immediately succeeding a previously ignited stage.

Each of the stages 301–304 is connected to a common output line 330 by means of capacitors 331–334 which are identical to capacitor 132 of FIG. 3. As with respect to FIG. 3, energization of any one of the stages produces an output pulse on line 330 which acts through the capacitors to turn off any previously energized stage.

An additional stage 304R is provided which is connected to transfer circuit 319. Stage 304R is similar to stage 304, but substitutes a very large resistor 335, for example 1 megohm, for the relay coil 314 of stage 304. Since resistor 335 is very large, it prevents stage 304R from remaining ionized once it is ignited. Thus, energization of stage 304R turns off any other stage that is on because of an output on line 330 and stage 304R is then extinguished by resistor 335 so that all of the stages 301–304 and 304R are off.

The grid of neon tube 305 of stage 301 is connected to accept key 15, and the tube is ignited whenever the key 15 is touched. The relay coil 311 of stage 301 is connected to relay switches 336 and 337. Operation of relay switch 336 connects voltage source 338 to capacitor 339. Capacitor 339 is connected to line 212, which is connected to reset lines 53 of each of the columns 201–204.

Upon relay switch 337 being actuated to the transfer position, row switching input line 226 is then connected to the row switching input line 51 of column 201. Similarly, relay coils 312–314 are connected to relay switches 340–342 so that ignition of the associated stage causes the relay switch to be thrown and thereby connect row switching input line 226 to row switching input line 51 of the associated column.

The output of stage 301 is connected by means of capacitor 331 and line 330 to output terminal 216. Thus, when stage 301 is ignited by key 15, capacitor 331 and line 330 provide an output pulse at terminal 216 to indicate to the computer that the operator is ready to accept data from the computer.

In operation, to transmit information to the terminal 10, the computer transmits a pulse to output/input terminal 223, which is transmitted by switch 220 to "data coming" lamp 17, turning on the lamp. When the operator is ready to receive the message, he touches accept key 15, igniting stage 301. The ignition of stage 301 provides an output pulse on line 330 which is transmitted to output terminal 216. This output pulse signals the computer that the operator is ready to receive the message. The ignition of stage 301 also throws relay switches 336 and 337. Relay switch 336 connects voltage source 338 to capacitor 339, which converts the voltage into a pulse which is transmitted by line 212 to reset input line 53 of each of the columns 201–204. This pulse then resets each of the columns so that only stage #R is on.

The computer then transmits the message by applying pulses to terminals 223 and 225. The pulses appearing on line 225 are transmitted by row switching input line 226 and switch 337 to row switching input line 51 of column 201. As described above, application of these pulses sequentially steps the stages of column 201 as long as pulses are applied. When the computer has transmitted a proper number of pulses so that the desired stage is ignited in column 201, the computer applies a pulse to terminal 223. This pulse is transmitted by switch 220 and column switching input line 320 to transfer circuit 316. As described above, the transfer circuit ignites stage 302 which extinguishes stage 301. This throws switch 340 and disconnects switches 336 and 337. In this manner, row switching input line 226 is now connected to row switching input line 51 of column 202. As before, the pulses applied to pulse input terminal 225 by the computer sequentially operate the stages of column 202 until the desired stage is ignited.

Then the computer supplies another pulse on output/input terminal 223 to ignite stage 303 and extinguish stage 302. The pulses on input terminal 225 then advance the stages of column 203 until the desired display is provided. The next pulse at terminal 223 ignites stage 304 and extinguishes stage 303 so that the stages of column 204 are then advanced by pulses at terminal 225.

Upon completion of transmission of the desired message, a final pulse is applied at output/input terminal 223. This pulse is transmitted by switch 220 and line 320 to transfer circuit 319 which ignites stage 304R, thereby extinguishing stage 304. Resistor 335 then extinguishes stage 304R so that all of the stages 301–304 and 304R are turned off, resetting that portion of the circuit. The selected stages of columns 201–204 remain ignited providing a continuing display until the keyboard 10 is cleared.

As a modification of the described invention, pulse input terminal 225 may be replaced by a pulse source for reading out data entered on the terminal 10 by the operator. The pulse source is actuated by read key 16, and has the advantage that two such terminals could be connected to one another and data could thus be transmited between the terminals without connection to a computer. Pulse input terminal 225 would still be required to allow the computer or another terminal to display a message at the terminal.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An input-output converter for use with an associated keyboard, said keyboard having an input line for each key therein and producing an output signal on a selected one of the plurality of output lines, to convert, under the control of an input pulse source, said output signal of said keyboard into a series of pulses indicative of the particular one of said lines having said output signal and to convert a series of input pulses from said input pulse source into a display as directed by said series of input pulses, comprising:

a plurality of three-element gas tube stages, each of said stages having an input terminal and an output terminal, each one of said output lines of said keyboard being connected to the input terminal of a corresponding one of said three-element gas tube stages, whereby an output signal on one of said output lines operates said corresponding three-element gas tube stage;

common output means connected to said output terminal of each of said gas tube stages to provide a pulse whenever one of said stages is operated;

a common input line connected to said pulse source;

a plurality of interconnection means connected to said common input line, each of said interconnection means being connected between the output terminal of a corresponding one of said gas tube stages to the input terminal of the sequentially adjacent one of said gas tube stages, said interconnection means being adapted for sequential transfer of data therebetween upon receipt of a pulse on said input line, whereby data is sequentially transferred along said stages in response to a chain of pulses received at said common input line from said pulse source; and display means adapted to utilize the illumination from said gas tube stages to provide an indication of which of said stages are ignited.

2. Keyboard apparatus having a plurality of conductive keys for providing, under the control of a series of input pulses, a series of output pulses indicative of the particular one of said keys having been touched, and for responding to a series of input pulses by providing a display as directed by said series of input pulses, comprising:

a plurality of three-element touch-sensitive gas tube stages, the grid of each one of said plurality of stages being connected to a corresponding conductive key of said keyboard;

a plurality of capacitors, one terminal of each of said capacitors being connected to the second element of a corresponding one of said plurality of gas tube stages;

a common output line connected to the other terminal of each of said capacitors;

an input line for receiving said series of input pulses;

a plurality of interconnections means, each connected to said input line and each connected between said second element of one of said plurality of stages to the grid of the sequentially adjacent one of said plurality of stages, said interconnection means being adapted for sequential transfer of data therebetween upon receipt of a pulse on said input line, whereby data is sequentially transferred along said stages in response to said series of input pulses; and display means adapted to utilize the illumination from said gas tube stages to provide an indication of which of said stages are ignited.

3. The apparatus of claim 2, wherein said gas tube stages are neon-gas tube stages.

References Cited by the Examiner

UNITED STATES PATENTS

| | | | |
|---|---|---|---|
| 2,405,096 | 7/1946 | Mumma | 235—92 |
| 2,649,502 | 8/1953 | Odell | 235—92 |
| 2,659,533 | 11/1953 | Quinby et al. | 235—145 |
| 2,719,250 | 9/1955 | Six et al. | 235—92 |
| 2,758,250 | 8/1956 | Ridler et al. | 235—92 |
| 2,818,558 | 12/1957 | Abbott | 34—365 X |
| 2,856,130 | 10/1958 | Woodward et al. | 235—145 |
| 2,869,035 | 1/1959 | Beasley | 235—92 |

OTHER REFERENCES

W. A. Goddard: "Non-Mechanical Keyboard," I.B.M. Technical Disclosure Bulletin, vol. 3, No. 11, page 31, April 1961.

LOUIS J. CAPOZI, *Primary Examiner.*

C. G. COVELL, *Assistant Examiner.*